United States Patent [19]
Roque

[11] 3,734,157
[45] May 22, 1973

[54] VEHICLE TIRE
[76] Inventor: V. Alfredo Roque, Apartado: 952, Managua, Nicaragua
[22] Filed: June 17, 1970
[21] Appl. No.: 46,846

[52] U.S. Cl..................................152/354, 152/158
[51] Int. Cl. ....................B60c 3/00, B60c 9/22
[58] Field of Search......................152/354, 355, 356, 152/357, 359, 352, 361, 153, 158

[56] References Cited
UNITED STATES PATENTS
3,414,036   12/1968   Skidmore.............................152/153
2,990,869   7/1961   Riley.....................................152/339
1,678,211   7/1928   Davidson..........................152/352 X
1,836,091   12/1931   Shoemaker............................152/352

FOREIGN PATENTS OR APPLICATIONS
193,351   2/1923   Great Britain........................152/153

Primary Examiner—Gerald M. Forlenza
Assistant Examiner—Robert Saifer
Attorney—Francis D. Stephens and Hugo Huettig, Jr.

[57] ABSTRACT

A vehicle tire having annular wire or rod strengthening contained in a plurality of separate ridges on the inner surface of the casing.

4 Claims, 2 Drawing Figures

PATENTED MAY 22 1973

3,734,157

INVENTOR
Alfredo Roque V.

VEHICLE TIRE

Heretofore tires have been made with fabric or cord embedded in the rubber. These materials lately have been made of nylon and of spun glass. Wire too has been used, as shown in U.S. Pat. No. 3,329,192 where steel wires 14 extend about the periphery of the tire embedded in the tread portion of the tire. This use of annular wire reinforcement is not entirely satisfactory as the tread portion of the tire is made more rigid and the stresses developed in the rubber of the tread may become excessive.

The objects of this invention are to provide a tire that requires only a very low inflation pressure, and which will not let the vehicle wheel down when pressure in the tire is lost so that control of the vehicle will be retained even if a "blowout" should occur.

In general, these objects are accomplished by using a plurality of internal, reinforced annular ridges which will remain substantially circular while the tire will retain its flexibility in the direction normal to the plane of the wheel.

The means by which the objects of the invention are obtained are described more fully with reference to the accompanying drawings in which.

Figures 1, 2:
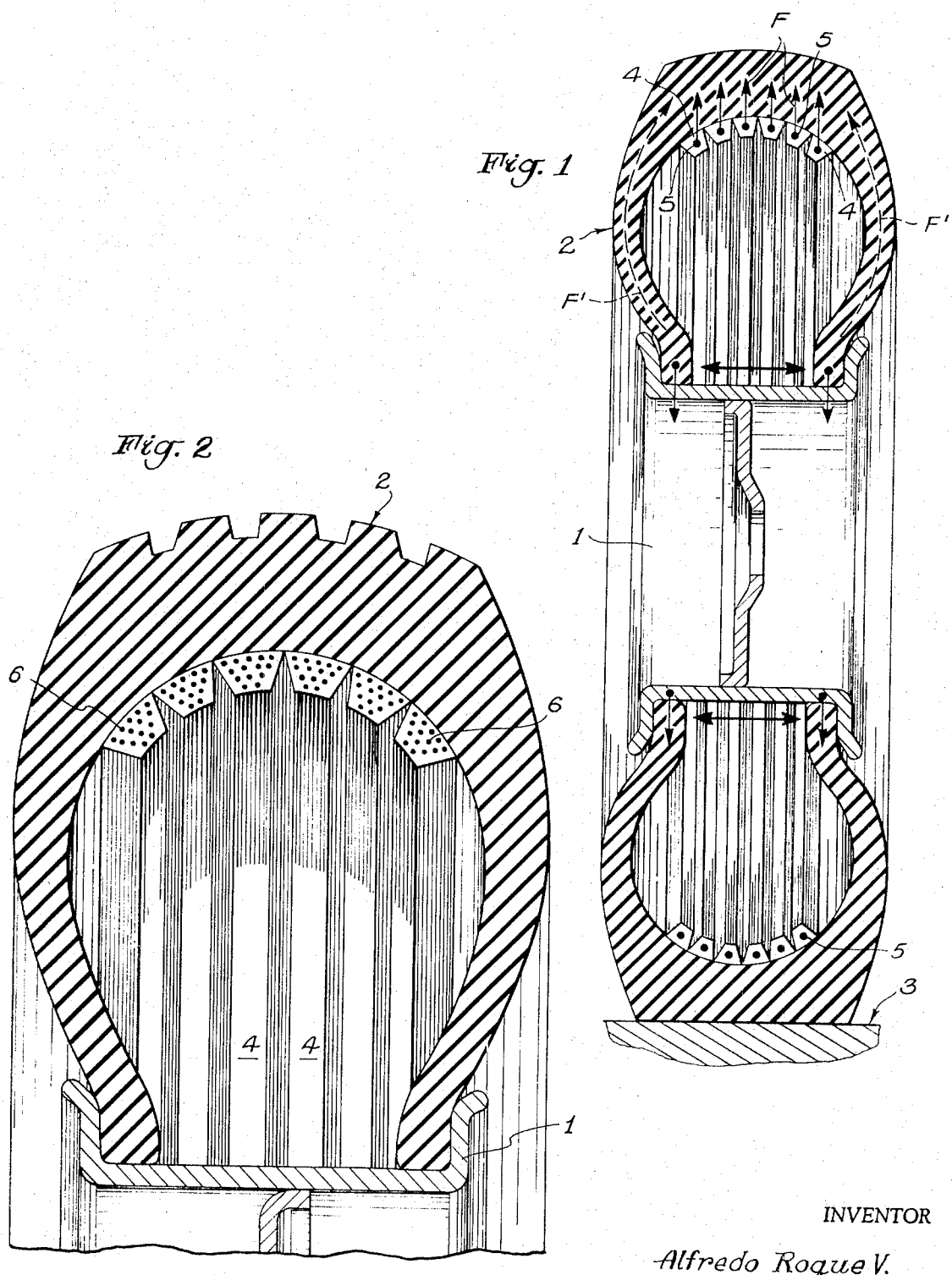
FIG. 1 is a cross-section of a wheel and tire in use.
FIG. 2 is a section of a modified tire of the present invention.

As shown in FIG. 1, a wheeled rim 1 has a tire 2 mounted thereon. This tire having a conventional air chamber therein is shown as running on a road surface 3 so that at its point of contact it is flattened against the road surface.

On the inner surface of the tread portion of the tire 2, that is, in the air chamber, are a plurality of contiguous annular ridges 4 each of trapezoidal section and each containing an annular reinforcing rod 5, or a plurality of reinforcing rods or wires 6 in the modified tire in FIG. 2.

These ridges 4 are shown as being trapezoidal in section and adhered at their wider side to the inner surface of the carcass of the tire so that the invention can be added to tires of general manufacture. It is clear, however, that the ridges 4 may be molded as an integral part of the tire at the time of manufacture.

Each ridge 4 with its reinforcement 5 or 6 has a fairly high degree of rigidity with a spring-like quality. From the arrows in FIG. 1, it is shown that, due to the flattening of the tread against the road surface 3, each ridge exerts an upward stress F distributed by the wide side of the ridge to the upper portion of the tire. These stresses are countered by a tension F' in the side walls of the tire. The wheel and rim 1, then, will be supported at all times, at least in part, by the tension in the side walls of the tire at its upper portion acting on the tire beads.

Under normal operating conditions using air pressure within the air chamber of the casing, the wheel will also be supported in part by the air in the tire. A minimum of air pressure will therefore be required for operation of the tire, which reduces the hazard of blowouts.

Due to having the reinforcing elements 5, or 6, mounted in separate ridges 4 having the V-shaped spaces therebetween, the tread portion of the tire retains a high degree of flexibility in the direction at right angles to the plane of the tire so that the bottom of the tire will readily flatten itself against the road surface to distribute the load of the tire.

In other tires having annular elements, such as U.S. Pat. No. 3,329,192, the tread portion of the tire is more rigid than desirable which places very high stresses in the tire when an unevenness, such as a rock, is passed over. It will be noticed that if a small rock were between the tire and the road surface 3 in FIG. 1 near one side of the tire the tire tread portion immediately over the rock is capable of upward movement, yet the tread at the other side of the tire would still bear on the road surface due to its flexibility. The clearance or space between the tapered ridges permits such flexibility while the broad contiguous bases of the trapezoidal ridges assures a relatively uniform distribution of the load to the far side of the tire.

The FIG. 2 structure is similar to that of FIG. 1 except that a plurality of smaller rods or wires 6 are substituted for the rod or wire 5.

Having now described the means by which the objects of the invention are obtained,

I claim:

1. A vehicle tire comprising tread portion, side wall portions and rim engaging beads at the inner extremities of said side wall portions to form, with a wheel rim, an enclosed air chamber, a plurality of parallel annular strongly reinforced ridges of trapezoidal section coaxially positioned, the broad bases of said, trapezoidal ridges being against the inner surface of said tread portion said ridges being contiguous with each other to provide V shaped spaces therebetween, said ridges cooperating with the inner surface of said tread portion to transmit radial compressive forces applied against the outer surface of said tread portion to said rim engaging beads by tension in said side walls at the side of said tire remote from said applied compressive forces, said ridges each including at least one annular spring metal reinforcing rod.

2. The vehicle tire of claim 1 in which said ridges include a plurality of annular strengthening wires.

3. The vehicle tire of claim 1 in which said annular ridges are adhered to the inner surface of said tread portion.

4. The vehicle tire of claim 1 in which said annular ridges are formed integrally with said tread portion.

* * * * *